United States Patent [19]
Haseda et al.

[11] Patent Number: 5,285,390
[45] Date of Patent: Feb. 8, 1994

[54] SIGNAL PROCESSING CIRCUIT FOR YAW-RATE SENSOR

[75] Inventors: Satoshi Haseda, Okazaki; Yoshihiko Tsuzuki, Toyota; Ichiro Akahori, Anjo; Hideo Inoue, Ashigarakami; Osamu Takeda, Susono, all of Japan

[73] Assignee: Nippondenso Co., Ltd., Kariya, Japan

[21] Appl. No.: 709,577

[22] Filed: Jun. 4, 1991

[30] Foreign Application Priority Data

Jun. 4, 1990 [JP] Japan .................. 2-146418

[51] Int. Cl.⁵ .............................................. B62D 5/00
[52] U.S. Cl. ................................ 364/424.05; 180/142
[58] Field of Search ................. 364/424.01, 424.05; 180/140–142, 79.1; 280/91

[56] References Cited

U.S. PATENT DOCUMENTS

| | | | |
|---|---|---|---|
| 4,628,734 | 12/1986 | Watson | 73/505 |
| 4,706,979 | 11/1987 | Kawake et al. | 280/91 |
| 4,828,061 | 5/1989 | Kimbrough et al. | 180/79.1 |
| 4,951,198 | 8/1990 | Watanabe et al. | 364/424.05 |
| 5,001,636 | 3/1991 | Shiraishi et al. | 364/424.05 |
| 5,001,637 | 3/1991 | Shiraishi et al. | 364/424.05 |
| 5,018,070 | 5/1991 | Eguchi | 364/424.05 |
| 5,019,982 | 5/1991 | Furukawa | 364/424.05 |
| 5,159,553 | 10/1992 | Karnopp et al. | 364/424.05 |

FOREIGN PATENT DOCUMENTS

| | | |
|---|---|---|
| 0150856 | 8/1985 | European Pat. Off. . |
| 0282041 | 9/1988 | European Pat. Off. . |
| 57-200813 | 12/1982 | Japan . |
| 60-67815 | 4/1985 | Japan . |
| 60-124571 | 7/1985 | Japan . |
| 61-2013 | 1/1986 | Japan . |

Primary Examiner—Thomas G. Black
Attorney, Agent, or Firm—Cushman, Darby & Cushman

[57] ABSTRACT

A signal processing circuit for removing a noise component from a detection signal of a yaw-rate sensor for detecting a yaw rate generated in a motor vehicle. The processing circuit detects the magnitude of variation of the detection signal of the yaw-rate sensor so as to compare the magnitude of the detection signal with a predetermined reference value. In accordance with the comparison result, the processing circuit outputs a limitation detection signal to limit the variation to below the predetermined reference value. Further, when the magnitude of variation of the detection signal exceeds the predetermined reference value, the processing circuit outputs as the limitation detection signal the yaw rate detection signal immediately before the exceeding, and the predetermined reference value is corrected on the basis of the steering angular velocity of the steering wheel of the motor vehicle. This arrangement allows effectively eliminating a spear-like noise from the detection signal of the yaw-rate sensor.

11 Claims, 11 Drawing Sheets

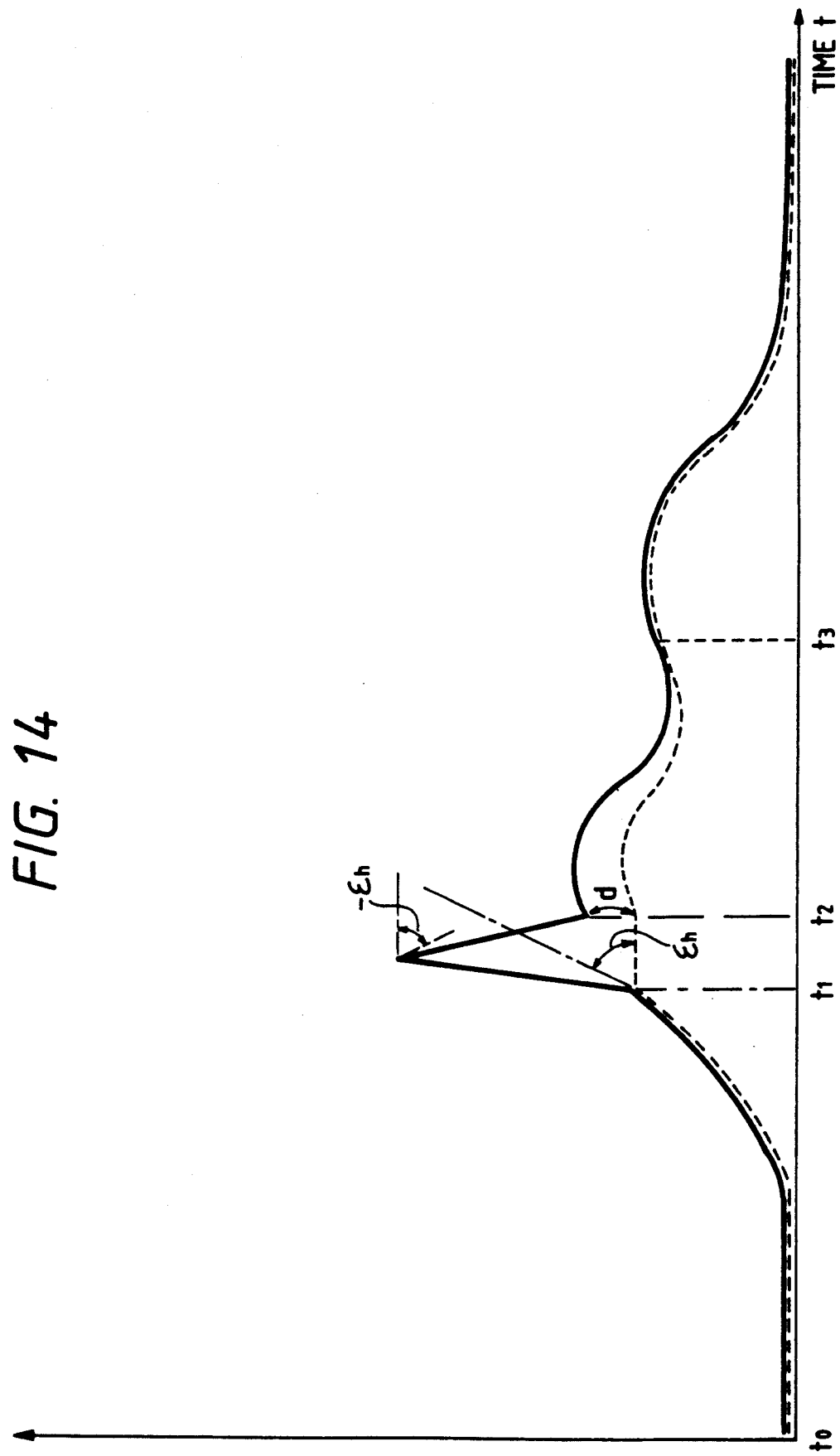

SIGNAL PROCESSING CIRCUIT FOR YAW-RATE SENSOR

BACKGROUND OF THE INVENTION

The present invention relates to a signal processing circuit which is responsive to a detection signal of a yaw-rate sensor so as to remove a noise component of the detection signal indicative of a yaw rate occurring with respect to a motor vehicle.

A conventionally yaw-rate sensor comprises a piezoelectric element such as disclosed in the U.S. Pat. No. 4,628,734 in which a plate-like driving piezoelectric device and a plate-like detecting piezoelectric device are arranged and coupled so as to be parallel to a detection axis and perpendicular to each other. With this arrangement, the plate-like driving piezoelectric device vibrates in response to application of an alternate-current drive voltage thereto. At this time, an angular velocity (rate) can be obtained by detecting a bending state of the plate-like detecting piezoelectric device in a direction perpendicular to the vibrating direction. Further, various yaw-rate sensors are known, such as a gas-rate sensor.

Here, on the detection signal of the yaw-rate sensor there is generally superimposed a noise component (high-frequency component) due to mechanical vibration and electrical noise, and therefore a process is required to eliminate the noise component. The conventional eliminating process of the noise component is effected by using an active filter (low-pass filter) constructed by an operational amplifier or a moving average type or recursive type digital filter (low-pass filter). However, there is the possibility that a noise with a sharp peak (spear-like noise) is superimposed on the detection signal of the yaw-rate sensor or a rapid signal variation occurs at the abnormal time such as a sensor fail. In such a case, difficulty is encountered to sufficiently eliminate the noise component by means of the aforementioned active filter or the aforementioned moving average type or recursive type digital filter. Further, in the case of increasing the order number of the filter, the active filter causes the circuit to becomes complex to increase the cost and the digital filter causes the calculation time to be taken largely to allow the phase lagging of the detection signal.

SUMMARY OF THE INVENTION

It is therefore an object of the present invention to provide a signal processing circuit for the yaw-rate sensor which is capable of eliminating the above described problems inherent to the conventional techniques concurrently with sufficiently removing the noise component included in the detection signal of the yaw-rate sensor with a simple arrangement.

In accordance with the present invention, there is provided a signal processing circuit for removing a noise component from a detection signal of a yaw-rate sensor for detecting a yaw rate generated in a motor vehicle. The processing circuit detects the magnitude of variation of the detection signal of the yaw-rate sensor so as to compare the magnitude of the detection signal with a predetermined reference value. In accordance with the comparison result, that is, when the magnitude of variation of the detection signal is greater than said predetermined reference value, the processing circuit outputs a limitation detection signal to limit the variation to below the predetermined reference value. Further, when the magnitude of variation of the detection signal exceeds the predetermined reference value, the processing circuit outputs as the limitation detection signal the yaw rate detection signal immediately before the exceeding, and the predetermined reference value is corrected on the basis of the steering angular velocity of the steering wheel of the motor vehicle. Still further, the signal processing circuit detects a speed of the motor vehicle so as to correct the predetermined reference value in accordance with the detected vehicle speed of the motor vehicle. This arrangement allows effectively eliminating a spear-like noise from the detection signal of the yaw-rate sensor.

In accordance with the present invention, there is further provided a signal processing circuit for removing a noise component from a detection signal of a yaw-rate sensor for detecting a yaw rate generated in a motor vehicle, comprising: means for obtaining the magnitude of variation of the detection signal of the yaw-rate sensor; first comparison means for comparing the magnitude of the detection signal with a first predetermined reference value; second comparison means for comparing the magnitude of the variation of the detection signal with a second predetermined reference value smaller than the first predetermined reference value; and output means for outputting a limitation detection signal to limit the variation to below the second predetermined reference value when the magnitude of variation of the detection signal is smaller than the first predetermined reference value and greater than the second predetermined reference value.

BRIEF DESCRIPTION OF THE DRAWINGS

The present invention will be described in further detail with reference to the accompanying drawings, in which:

FIG. 14 is a graphic illustration useful for understanding the FIG. 13 operation.

DETAILED DESCRIPTION OF THE INVENTION

Figure 1:
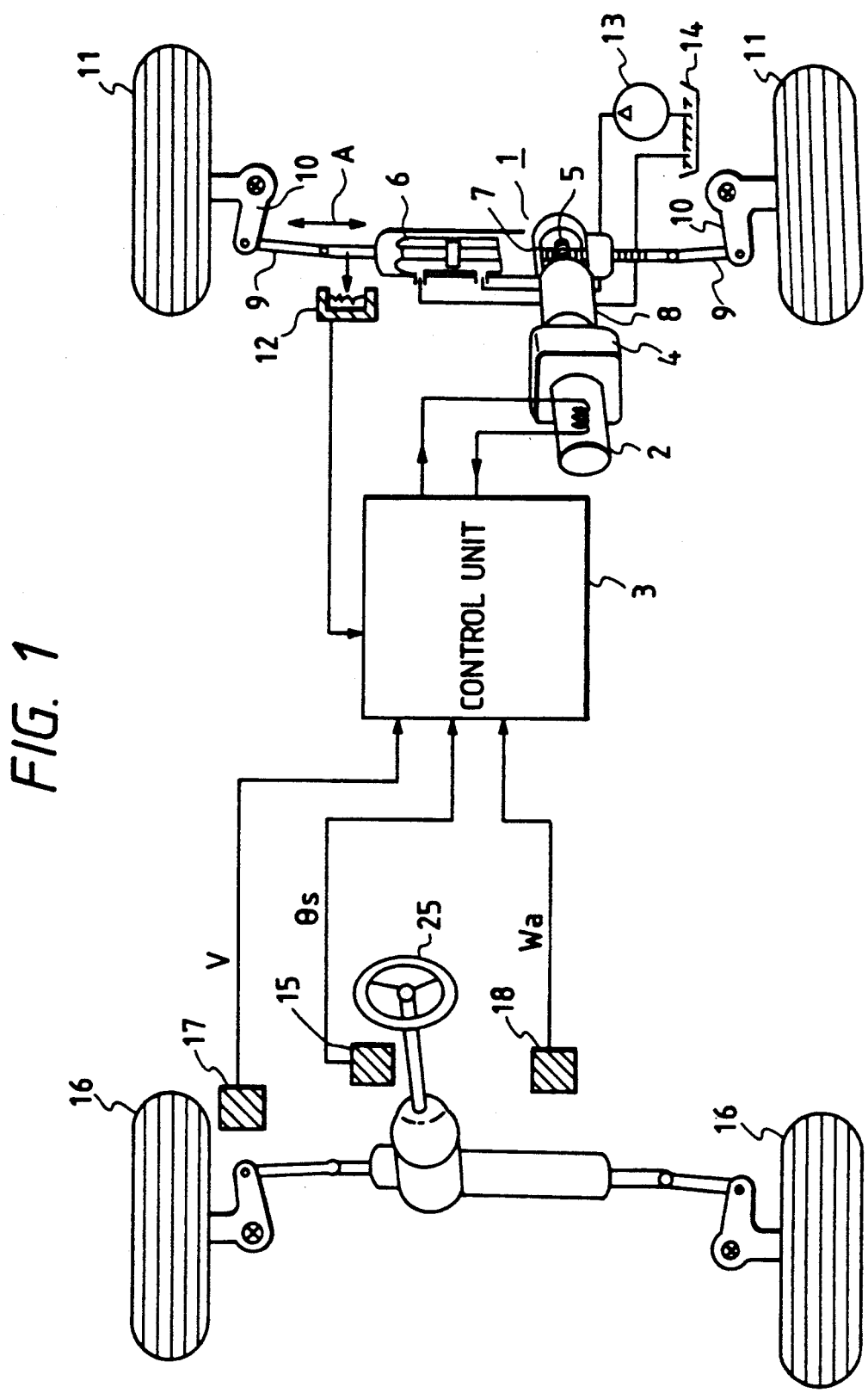
FIG. 1 is a schematic illustration of a rear-wheel steering control system according to an embodiment of the present invention which is incorporated into a motor vehicle.

Referring now to FIG. 1, there is schematically illustrated a rear-wheel steering angle control system according to an embodiment of the present invention which is incorporated into a motor vehicle. In FIG. 1, illustrated at numeral 1 is a rear-wheel steering mechanism including a direct-current servo motor 2 which reversibly rotates in response to an electrical command signal from an electric control unit 3 and which is coupled through a reduction gear 4 to a rack and pinion mechanism with a hydraulic power assist, i.e., an input shaft (unshown torsion bar) of the steering mechanism 1. To the other end of the torsion bar there is attached a pinion gear 5 which is engaged with a rack 7 provided at one end of a power piston 6. That is, one end portion of the torsion bar is rotated by means of the motor 2 so that the torsion bar is twisted so as to change the area of the restriction of a hydraulic valve 8. Thus, the hydraulic pressure is applied in a direction that the torsion of the torsion bar is corrected, whereby a power piston 6 is operated. Both ends of the power piston 6 are respectively coupled through tie rods 9 to steering arms 10. The rear wheels 11 are arranged to be freely movable in the right and left directions through the steering arms 10. Accordingly, when the power piston 6 is moved in the directions indicated by character A in FIG. 1, the rear in the right and left directions. Further, in response to the torsion bar being released from the torsion, the area of the restriction of the hydraulic valve 8 becomes zero and hence the hydraulic pressure for moving the power piston 6 also becomes zero so as to stop the power piston 6. Here, a rear-wheel steering angle sensor 12 detects the position of the power piston 6 and outputs a signal indicative of the detected position thereof. On the basis of this detection signal therefrom, the electric control unit 3 calculates a rear-wheel steering angle in accordance with the relation between the position of the power piston 6 and the rear-wheel steering angle and further obtains a steering angular velocity on the basis of the rate of change of the rear-wheel steering angle. The control unit 3 and the steering mechanism 1 including the servo motor 2 construct a positioning servo system to control the positioning of the rear wheels 11 so that the rear-wheel steering angle is coincident with the rear-wheel steering angle command position. Here, numeral 13 represents a hydraulic pump for supplying a hydraulic pressure through the hydraulic valve 8 to the power piston 6, and numeral 14 designates an oil tank.

A front-wheel steering angle sensor 15 detects the rotation of a steering wheel 25 so as to output a front-wheel steering angle signal corresponding to the steering angle $\theta s$ of the front wheels 16 which is in turn supplied to the control unit 3. A vehicle speed sensor 17 detects the rotational speed of the wheel shaft or wheel to output a vehicle speed signal corresponding to the speed of the motor vehicle to the control unit 3. A yaw-rate sensor 18, being composed of a gyro or the like, generates a yaw-rate signal corresponding to a rotational angular velocity (yaw rate Wa) about the center of gravity of the motor vehicle, the yaw-rate signal being also outputted to the control unit 3.

Figure 2:
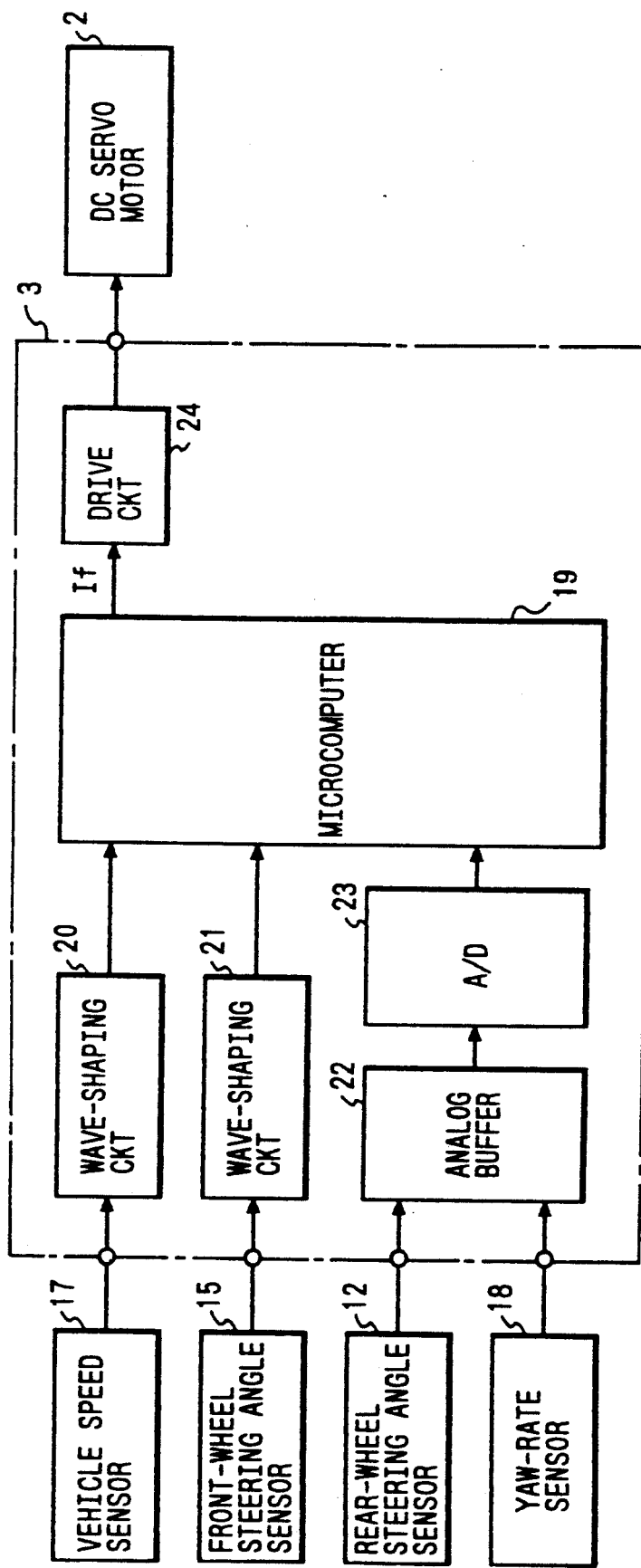
FIG. 2 is an illustration of an arrangement of an electric control unit to be used in the rear-wheel steering control system.

A description will be made hereinbelow with reference to FIG. 2 in terms of the control unit 3. The control unit 3 is composed of a microcomputer 19, waveform shaping circuits 20, 21, an analog buffer circuit 22, an analog-to-digital (A/D) converter 23 and a drive circuit 24. The waveform shaping circuit 20 is responsive to the vehicle speed signal from the vehicle speed sensor 17 for waveshaping the vehicle speed signal to output it to the microcomputer 19, and the waveform shaping circuit 21 is responsive to the signal from the front-wheel steering angle sensor 15 to waveshaping the steering angle signal to output it to the microcomputer 19. The output signals of the rear-wheel steering angle sensor 12 and the yaw-rate sensor 18 are coupled through the analog buffer circuit 22 to the A/D converter 23 to be converted into digital forms. Further, the drive circuit 24 supplies the direct-current servo motor 2 with a current corresponding to a current command value signal If from the microcomputer 19.

Figure 3:
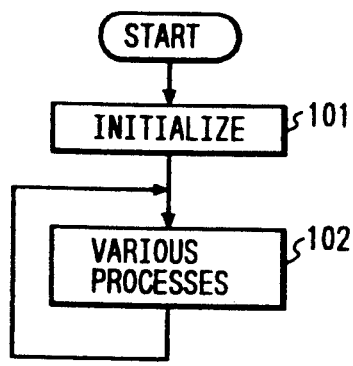
FIGS. 3 to 5 are flow charts showing basic operation to be executed by the electric control unit.
Figure 4:
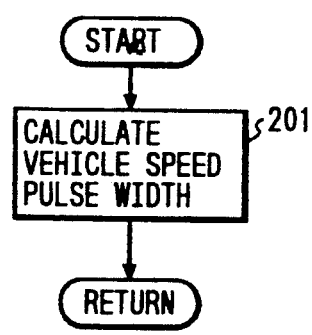
Figure 5:
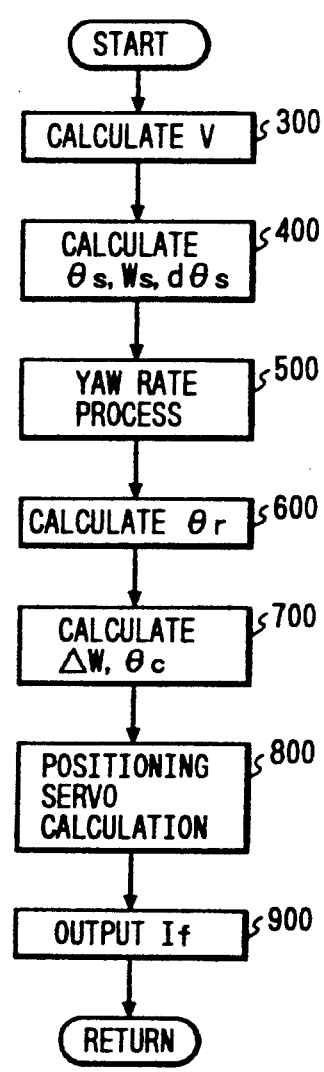

The operation of the rear-wheel steering angle control system thus arranged will be described hereinbelow. FIG. 3 is a flow chart showing the main processing routine for the microcomputer 19, FIG. 4 is a flow chart illustrating a vehicle speed pulse processing routine to be executed on the basis of a pulse signal from the vehicle speed sensor 17, and FIG. 5 is a flow chart showing an interrupt processing routine to be executed at a predetermined time interval (for example, every 5 ms). As illustrated in FIG. 3, the microcomputer 19 is arranged to be initialized with a step 101 at the time of start and then to execute various processes with a step 102. On the other hand, as illustrated in FIG. 4, the microcomputer 19 calculates the width of the vehicle speed pulse on the basis of the generation times of the previous and present interrupts in a step 201. Further, as shown in FIG. 5, the microcomputer 19 executes a step 300 to calculate a vehicle speed V in accordance with the vehicle speed pulse process, and then executes a step 400 so as to calculate the front-wheel steering angle $\theta s$ on the basis of the signal from the front-wheel steering angle sensor 15, calculate the steering angular velocity $d\theta s$ on the basis of the calculated front-wheel steering angle $\theta s$, and further calculates the target yaw rate Ws on the basis of the calculated front-wheel steering angle $\theta s$ and the vehicle speed V in accordance with the following equation.

$$Ws = \frac{V}{1 + K \cdot V^2} \cdot \frac{1}{l \cdot N} \cdot \theta s$$

where K represents a stability factor indicative of the under-steering or over-steering characteristic of the motor vehicle, and designates a wheel base of the motor vehicle, and N is a steering gear ratio.

Figure 6:
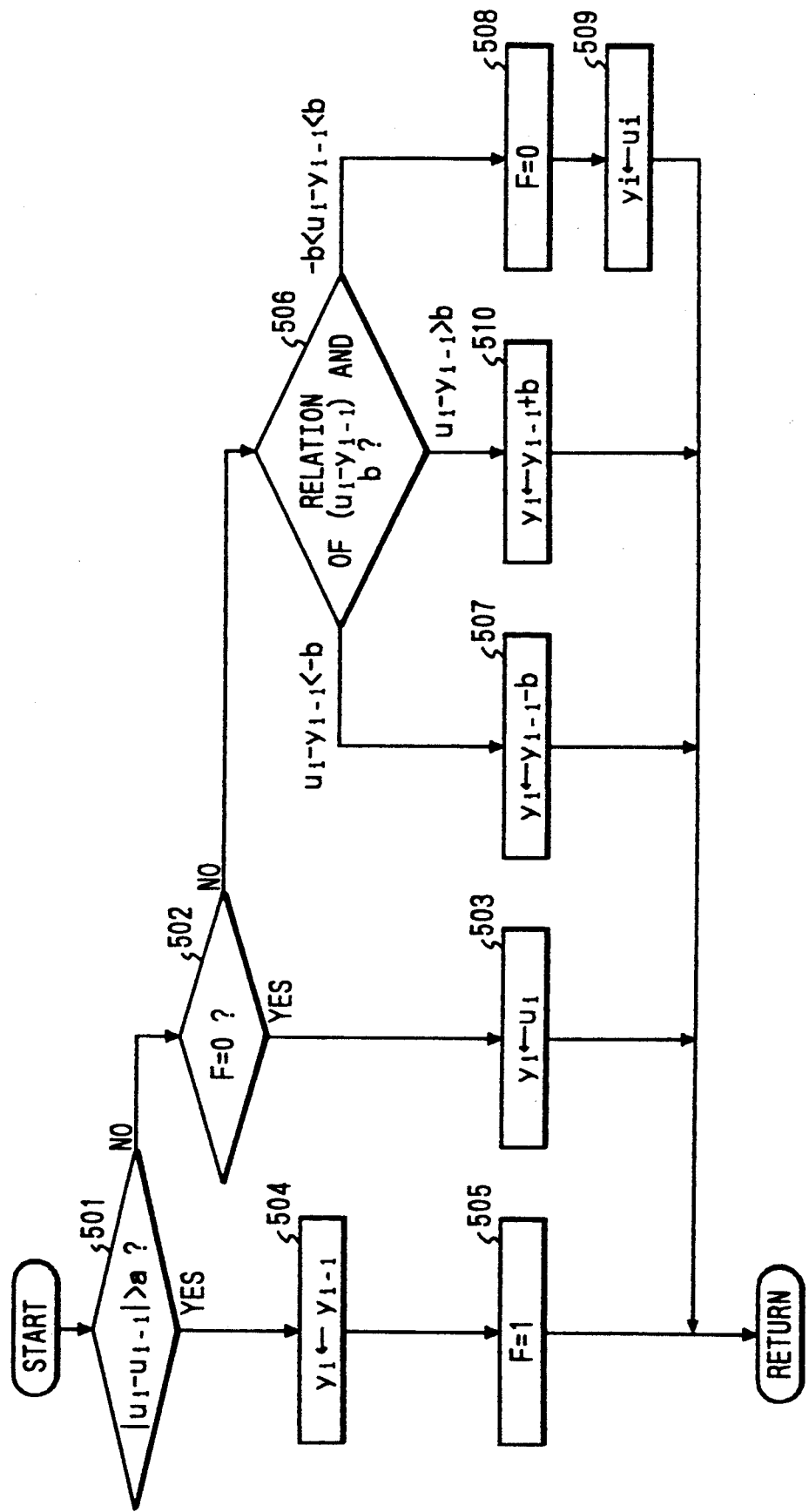
FIG. 6 is a flow chart showing a yaw rate process to be executed for this embodiment.
Figure 7A:
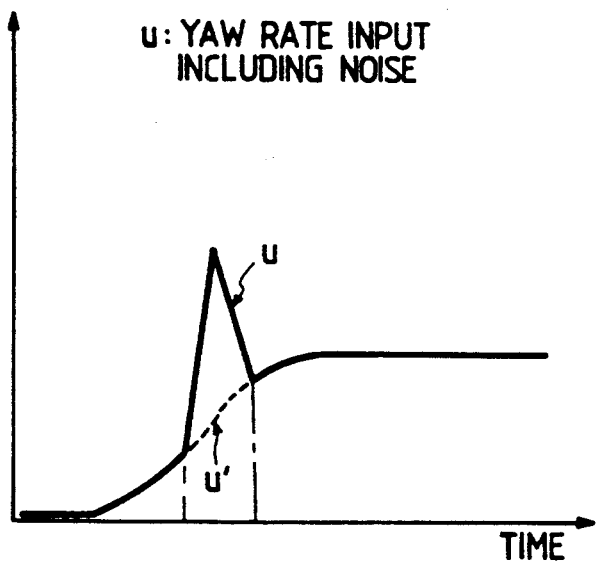
FIG. 7A is a graphic diagram showing a state that a spear-like noise is introduced into a yaw rate signal.

Further, the microcomputer 19 executes a step 500 for the yaw rate processing routine on the basis of the signal from the yaw-rate sensor 18. The yaw rate processing routine will be described hereinbelow with reference to FIGS. 6 and 7B. FIG. 7A shows a state that a spear-like noise is superimposed on the yaw rate signal where character u' represents the case of no noise and u designates a waveform to be obtained by the superimposition of the spear-like noise. In FIG. 6, the microcomputer 19 first executes a step 501 to check whether the absolute value of the difference between the present yaw rate input value $u_i$ and the previous yaw rate input value $u_{i-1}$ is greater than a predetermined value a (corresponding to the rate of change $\epsilon_h$, positive number). Here, the rate of change $\epsilon_h$ is for removing a spike noise and is set to a value greater than the rate of change of the yaw rate which is not taken in the behavior of the motor vehicle. If the comparison result is $|u_i - u_{i-1}| < a$, the microcomputer 19 executes a step 502 in order to check a flag F is "0". Here, the flag F represents the fact in terms of whether or not the yaw rate input value is in the held state and is initialized (F=0) in response to the turning-on of the key switch. If the flag F=0, the microcomputer 19 executes a step 503 to directly output the input value $u_i$ as the yaw rate output value $y_i$ (from the time $t_0$ to the time $t_1$ in FIG. 7B). On the other hand, if in the step 501 the absolute value of the difference between the present yaw rate input value $u_i$ and the previous yaw rate input value $u_{i-1}$ is greater than the predetermined value ($\epsilon_h$), the microcomputer 19 executes a step 504 to output the previous yaw rate output value $y_{i-1}$ as the present yaw rate output value $y_i$ (from the time $t_1$ to the time $t_2$ in FIG. 7B). Further, the microcomputer 19 effects a step 505 to set the flag F to "1" (at the time $t_1$).

Figure 7B:
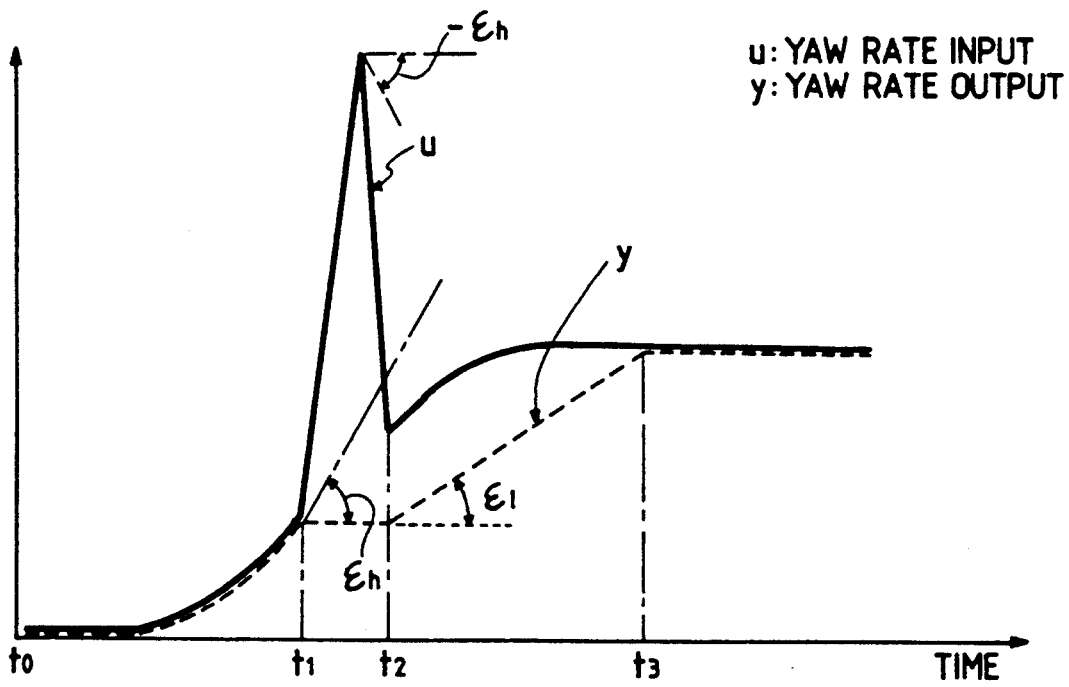
FIG. 7B is a graphic illustration for describing the yaw rate process.

Moreover, if in the step 502 of the next routine the flag F is "1", the microcomputer 19 effects a step 506 to compare a predetermined value b (corresponding to the rate of change $\epsilon_l$ ($<\epsilon_h$), positive number) with the difference between the present yaw rate input value $u_i$ and the previous yaw rate output value $y_{i-1}$. Here, the rate of change $\epsilon_l$ is set so as to suppress the execution of control at an undesired speed when steering the rear wheels in accordance with the yaw rate variation. If ($u_i - y_{i-1}$) is greater than b, the microcomputer 19 executes a step 510 to output ($y_{i-1} + b$) as the present yaw rate output value $y_i$ (at the time $t_2$ in FIG. 7B), i.e., output it under the rate of change $\epsilon_l$. Further, if $-b < (u_i - y_{i-1}) \leq b$, the microcomputer 19 executes a step 508 to set F=0 and then executes a step 509 so as to output the present yaw rate input value $u_i$ as the present yaw rate output value $y_i$ (at the time $t_5$ in FIG. 7). Still further, if ($u_i - y_{i-1}$) < $-b$ in the step 506, the microcomputer 19 executes a step 507 in order to output ($y_{i-1} - b$) as the present yaw rate output value $y_i$. As a result, as shown in FIG. 7B, even in the case that a noise with a sharp peak (spear-like noise) generated from the time $t_1$ to the time $t_2$ is superimposed on the yaw rate signal, the noise can be eliminated.

Returning again to FIG. 5, the microcomputer 19 executes a step 600 to calculate a rear-wheel real steering angle $\theta_r$ on the basis of the signal from the rear-wheel steering angle sensor 12, and then executes a step 700 to obtain the difference between the real yaw rate Wa (=y) obtained in the step 500 and the target yaw rate Ws obtained in the step 400 so as to calculate the rear-wheel steering angle command position $\theta_c$ in accordance with the following equation.

$$\theta_c = F(\Delta W, V)$$

where F($\Delta$W, V) is a function where the yaw rate difference $\Delta$W and the vehicle speed V are parameters.

In addition, the microcomputer 19 executes a step 800 to perform a generally known rear-wheel positioning servo calculation on the basis of the rear-wheel steering angle command position $\theta_c$ and the rear-wheel real steering angle $\theta_r$ so as to iron out the difference therebetween. In accordance with this calculation result, the microcomputer 19 calculates the current command value signal If in a step 900 to output it to the drive circuit 24 to drive the servo motor 2.

As described above, in this embodiment the digital filter is provided so that, when the rate of change of the yaw rate input value from the yaw-rate sensor 18 is greater than the set value $\epsilon_h$, the yaw rate output value immediately before the exceeding is outputted. Thus, it is possible to remove the spear-like noise, superimposed on the yaw rate signal of the motor vehicle, with a simple arrangement without occurrence of the phase lagging. In addition, it is possible to prevent the undesirable rapid steering of the rear wheels at the time of the sensor fail or the like. Further, when the rate of change of the yaw rate input value returns to below the set value $\epsilon_h$, the output value is arranged so as to gradually approach the input value (from the time $t_2$ to the time $t_3$ in FIG. 7B). This is for suppressing the rapid variation of the output at the time of the returning.

Figure 8:
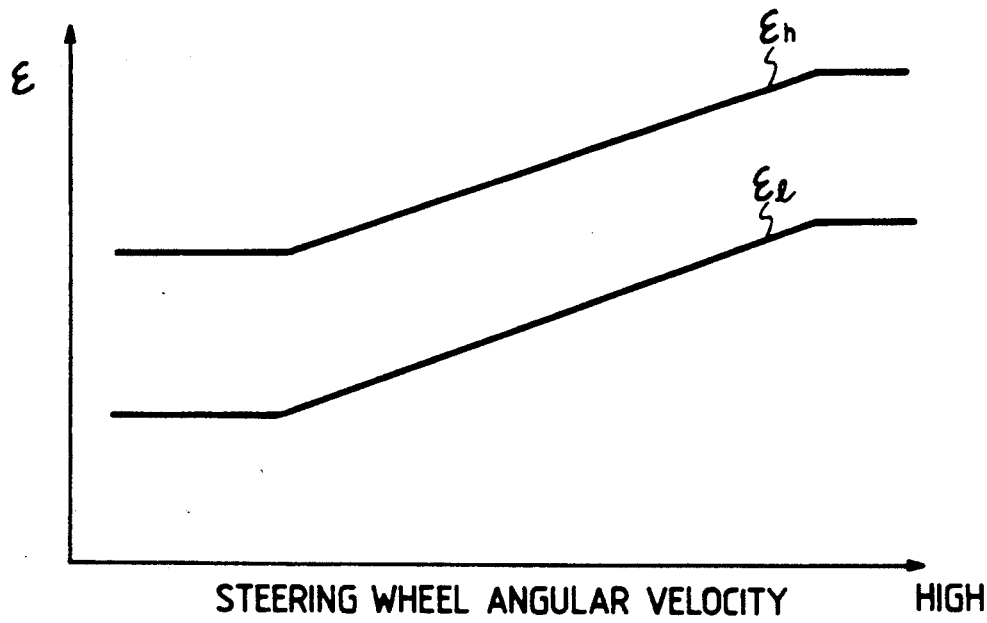
FIGS. 8 and 9 are graphic illustrations for describing the other embodiments of this invention.
Figure 9:
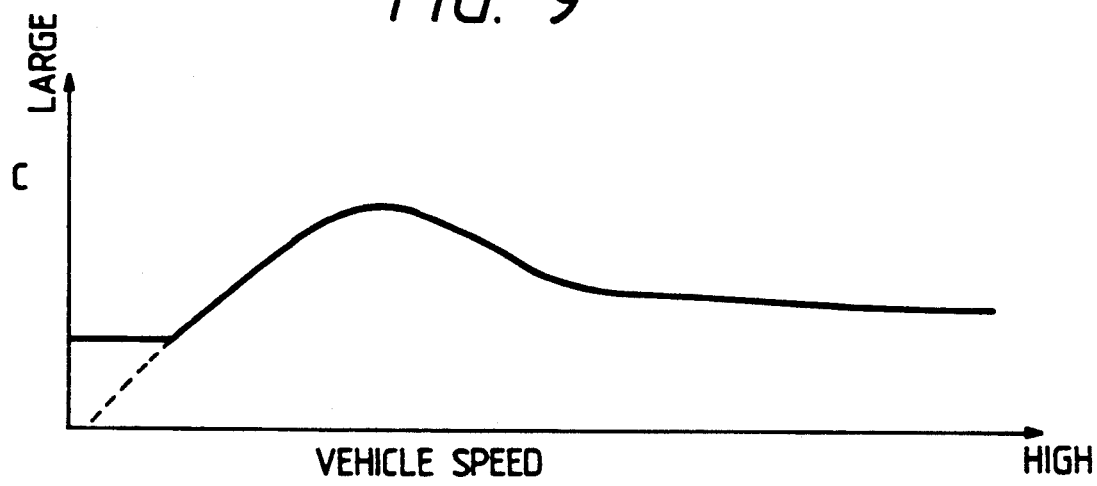
Figure 10:
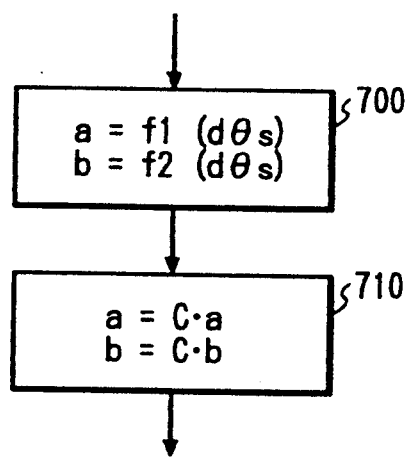
FIG. 10 is a flow chart showing a process to be executed for the FIG. 8 and 9 embodiments.

Here, this invention is not limited to the above-described embodiment. For instance, it is appropriate that, as illustrated in FIG. 8, the changing rates $\epsilon_h$ and $\epsilon_l$ of the yaw rate input are arranged to vary in accordance with the steering wheel angular velocity. Further, it is also appropriate that, as illustrated in FIG. 9, a correction coefficient C ($\epsilon = C\epsilon$·) for the ranging rates $\epsilon_h$ and $\epsilon_l$ of the yaw rate input is arranged so as to vary in accordance with the vehicle speed. In addition, it is also appropriate that the changing rates $\epsilon_h$ and $\epsilon_l$ of the yaw rate input are arranged to vary in accordance with the steering wheel angular velocity and the vehicle speed. More specifically, as illustrated in a flow chart of FIG. 10, in a step 700 the values a and b respectively corresponding to the rates of change $\epsilon_h$ and $\epsilon_l$ having the characteristic as shown in FIG. 8 are calculated on the basis of the steering angular velocity $d\theta_s$. Further, in a step 710 the values a and b calculated in the step 700 are multiplied by the coefficient C depending on the vehicle speed as illustrated in FIG. 9 so as to calculate a value to be compared with the absolute value of the difference between the present and previous yaw rate input values $u_i$ and $u_{i-1}$. These steps 700 and 710 may be executed prior to the step 501 and step 506 of the FIG. 6 flow chart.

Figure 13:
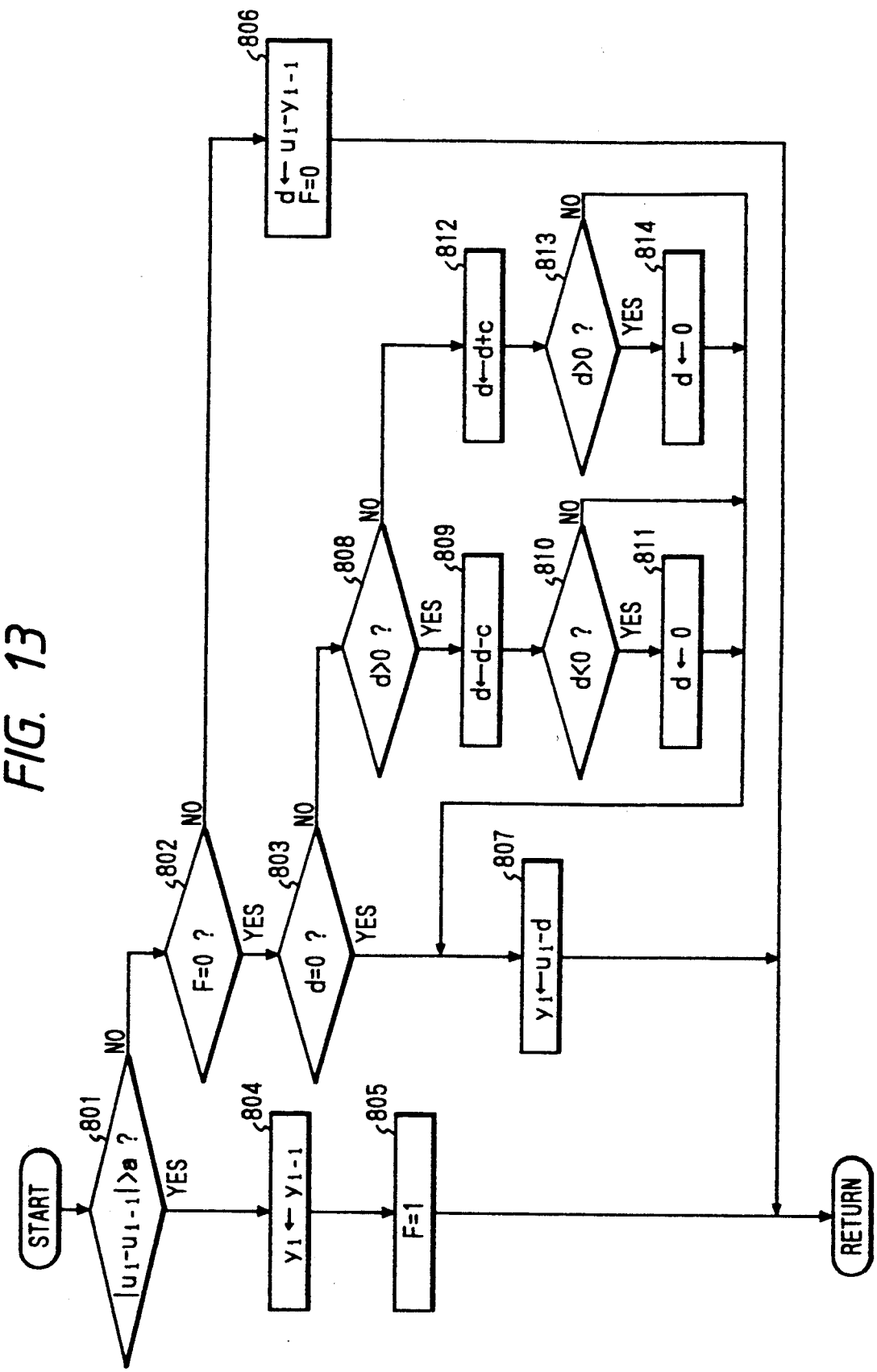
FIG. 13 is a flow chart for describing the operation to be executed when a yaw rate signal returns to the normal state.

Moreover, a description will be made hereinbelow with reference to FIGS. 13 and 14 in terms of a possible process to be taken when in the processing flow of FIG. 6 the spear-like noise introduced into the yaw rate signal is removed so as to return to the normal state. FIG. 13 flow chart is different in processes below the steps 506 and 503 (from $t_2$ to $t_3$ in FIG. 14) from the FIG. 6 flow chart. In FIG. 13, when the spear-like noise once occurs and the yaw rate output is kept (from $t_1$ to $t_2$ in FIG. 14) and the variation $|u_i - u_{i-1}|$ of the yaw rate input value after the time $t_2$ becomes $|u_i - u_{i-1}| < a$, the operational flow goes to a step 806. The step 806 is provided in order to calculate the difference d ($= u_i - y_{i-1}$) between the present yaw rate input ui and the previous output $y_{i-1}$. Further, the flag F is initialized so as to be F=0. In the next processing cycle, if the answer of a step 801 is $|u_i - u_{i-1}| < a$ (from $t_2$ to $t_3$ In FIG. 14), F=0 is decided in a step 802 and hence control advances to a step 803 so as to check whether d=0. If not, the control goes to a step 808 in order to check whether d is positive or negative and perform the addition or subtraction of a small positive number c to or from d so that d approaches 0 (steps 809 to 811 or 812 to 814). In a step 807 a value obtained by subtracting d from the present input value $u_i$ is outputted as the present output $y_i$. That is, at the time of changing (returning) from the state that yaw rate signal variation is above $\epsilon_h$ due to the spear-like noise or the like to the state that it becomes below $\epsilon h$ due to the normalization of the yaw rate signal, the difference d between the present yaw rate input value and the previous yaw rate value is calculated as the offset and the yaw rate output value is processed so that the yaw rate sensor detection value is relatively coincident in variation with the yaw rate output value and the offset d at the time of the returning is processed so as to gradually become close to 0 (approaching the ture yaw rate input value). The speed that the yaw rate output value after the returning approaches the ture yaw rate input value determines the constant c. Here, at the time of the initialization of the program, $d=F=0$. In the case that the absolute value of the difference between the present yaw rate input value and the previous yaw rate input value is $|u_i-u_{i-1}|$, the processes of the steps 501, 502 and 503 in FIG. 6 are the same as the processes of the steps 801, 802, 803 and 807 (between $t_0$ and $t_1$ and after $t_3$ in FIG. 7B, and between $t_0$ and $t_1$ and after $t_2$ in FIG. 14). These processes allow the successive and smooth execution of the rear-wheel steering control and minimizing the influence of the noise to the vehicle behavior to ensure the controllability and stability of the motor vehicle.

Figure 11:
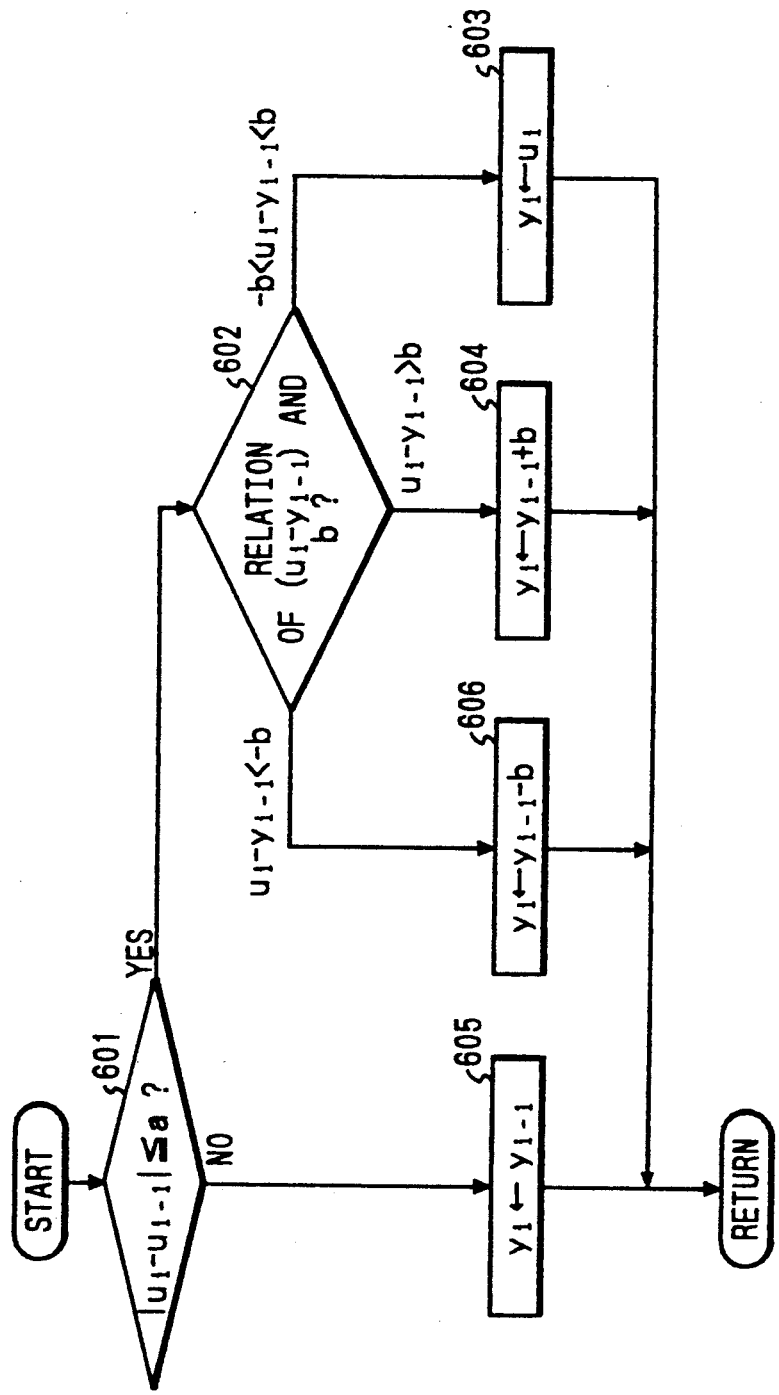
FIG. 11 is a flow chart showing the other yaw rate process in this invention.
Figure 12:
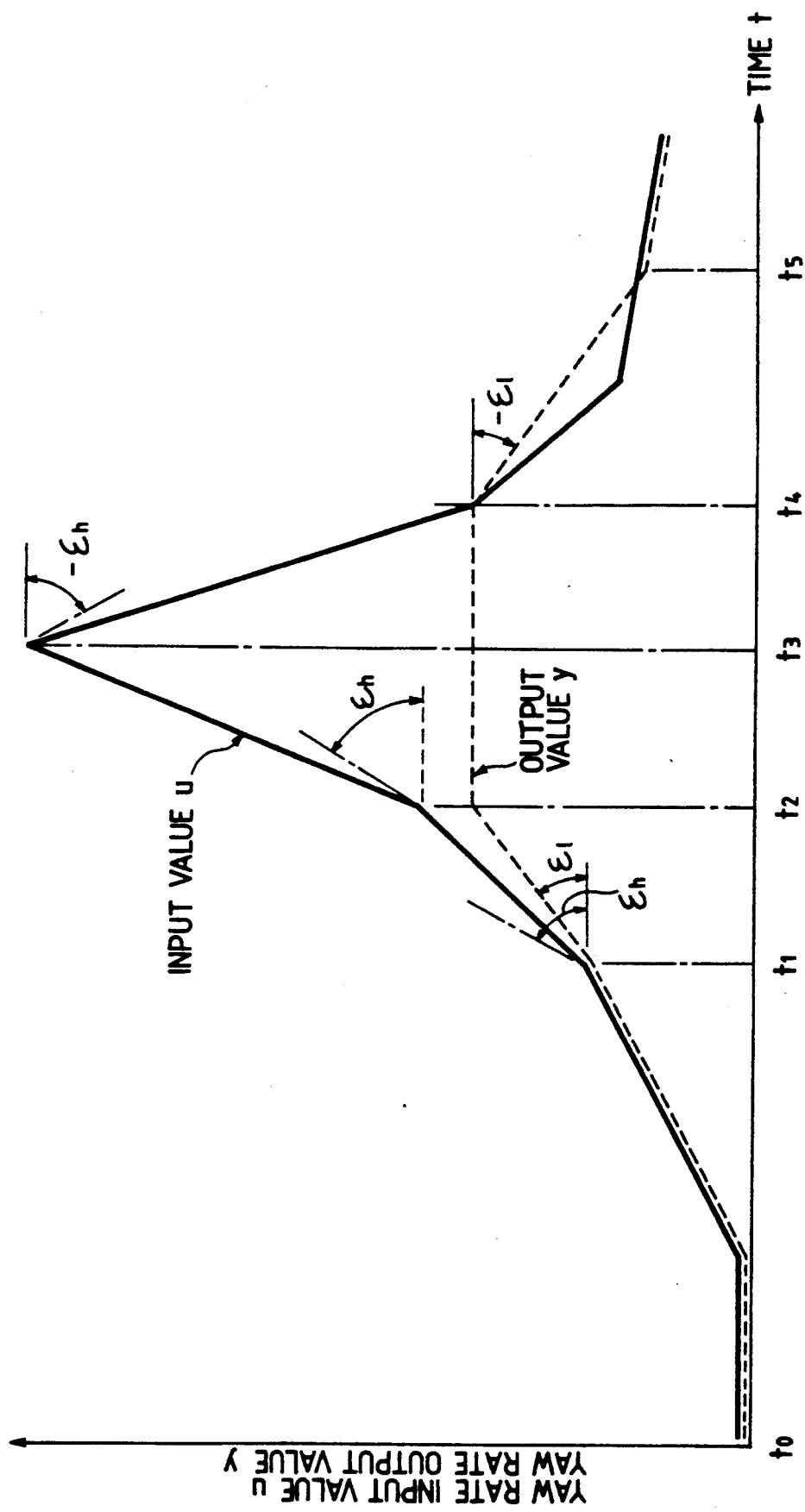
FIG. 12 is a graphic illustration for describing the FIG. 11 yaw rate process.

Still further, it is appropriate to perform the operation as illustrated in a flow chart of FIG. 11. That is, the microcomputer 19 first executes a step 601 to check whether the absolute value of the difference between the present yaw rate input value $u_i$ and the previous yaw rate input value $u_{i-1}$ is greater than a predetermined value a (rate of change $\epsilon_h$). If smaller, the microcomputer 19 effects a step 602 to compare the difference between the present yaw rate input value $u_i$ and the previous yaw rate output value $y_{i-1}$ with a predetermined value b (rate of change $\epsilon_l$). If $-b<(u_i-y_{i-1})<b$, the microcomputer 19 performs a step 603 to output the present yaw rate input value $u_i$ as the present yaw rate output value $y_i$ (from the time $t_0$ to the time $t_1$ in FIG. 12). On the other hand, if $(u_i-y_{i-1})>b$ in the step 602, the microcomputer 19 executes a step 604 to output $(y_{i-1}+b)$ as the present yaw rate output value $y_i$ (from the time $t_1$ to the time $t_2$ in FIG. 12. If $(u_i-u_{i-1})>a$ in the step 601, the microcomputer 19 executes a step 605 to set the previous output value $y_{i-1}$ as the present yaw rate output value $y_i$ (from the time $t_2$ to the time $t_4$ in FIG. 12). If $(u_i-y_{i-1})<-b$ in the step 602, the microcomputer 19 executes a step 606 to output $(y_{i-1}-b)$ as the present yaw rate output value $y_i$ (from the time $t_4$ to the time $t_5$ in FIG. 12).

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A signal processing circuit for removing a noise component from a detection signal of a yaw-rate sensor which detects a yaw rate generated in a motor vehicle, comprising:
    means for obtaining a magnitude of variation of the detection signal of the yaw-rate sensor;
    comparison means for comparing the magnitude of variation of the detection signal with a predetermined reference value; and
    output means for outputting a limitation detection signal which limits the magnitude of variation to below said predetermined reference value when the magnitude of variation of the detection signal is determined to be greater than said predetermined reference value by the comparison means, and for generating a detection signal with its noise component removed based on the limitation detection signal.

2. A signal processing circuit as claimed in claim 1, wherein, when the magnitude of variations of the detection signal exceeds said predetermined reference value, said output means outputs as said limitation detection signal the yaw rate detection signal immediately before the exceeding.

3. A signal processing circuit as claimed in claim 2, further comprising means for, in the case of changing from the state that the magnitude of the variation of the detection signal exceeds said predetermined reference value to the state that it becomes below said predetermined reference value, calculating the difference between the detection signal value of said yaw rate sensor at the changing time and the previous output value, and comprising means for processing the yaw rate output value so that the yaw rate output value is relatively coincident in variation with the yaw rate detection signal value after the changing, and comprising means for gradually reducing the calculated difference so that the yaw rate output value approaches the detection signal value of said yaw rate sensor.

4. A signal processing circuit as claimed in claim 1, further comprising vehicle speed detecting means for detecting a speed of said motor vehicle and a correction means for correcting said predetermined reference value in accordance with the detected vehicle speed of said motor vehicle.

5. A signal processing circuit as claimed in claim 1, further comprising drive means for driving a rear-wheel steering mechanism of said motor vehicle on the basis of the yaw rate detection signal outputted from said output means so as to steer rear wheels of said motor vehicle.

6. A signal processing circuit as claimed in claim 1, further comprising detection means for detecting a steering angular velocity of a steering wheel of said motor vehicle, and correction means for correcting said predetermined reference value on the basis of the detected steering angular velocity of said steering wheel.

7. A signal processing circuit for removing a noise component from a detection signal of a yaw-rate sensor which detects a yaw rate generated in a motor vehicle, comprising:
    means for obtaining a magnitude of variation of the detection signal of the yaw-rate sensor;
    first comparison means for comparing the magnitude of variation of the detection signal with a first predetermined reference value;
    second comparison means for comparing the magnitude of variation of the detection signal with a second predetermined reference value which is smaller than said first predetermined reference value; and
    output means for outputting a limitation detection signal which limits the magnitude of variation to below said second predetermined reference value when the magnitude of variation of the detection signal is smaller than said first predetermined reference value and greater than said second predetermined reference value, as determined by the first and second comparison means, and for generating a detection signal with its noise component removed based on the limitation detection signal.

8. A signal processing circuit as claimed in claim 7, further comprising detection means for detecting a steering angular velocity of a steering wheel of said motor vehicle, and correction means for correcting said first and second predetermined reference values on the basis of the detected steering angular velocity of said steering wheel.

9. A signal processing circuit as claimed in claim 7, further comprising vehicle speed detecting means for detecting a speed of said motor vehicle and a correction means for correcting said first and second predetermined reference values in accordance with the detected vehicle speed of said motor vehicle.

10. A signal processing circuit as claimed in claim 7, further comprising drive means for driving a rear-wheel steering mechanism of said motor vehicle on the basis of the yaw rate detection signal outputted from said output means so as to steer rear wheels of said motor vehicle.

11. A signal processing circuit as claimed in claim 7, where, when the magnitude of variation of the detection signal exceeds said first predetermined reference value, said output means outputs as said limitation detection signal the yaw rate detection signal immediately before the exceeding.

* * * * *